United States Patent
Koy et al.

(10) Patent No.: US 11,720,626 B1
(45) Date of Patent: *Aug. 8, 2023

(54) IMAGE KEYWORDS

(71) Applicant: Pinterest, Inc., San Francisco, CA (US)

(72) Inventors: Albert Koy, San Francisco, CA (US); Xiaodong Wang, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/315,197

(22) Filed: May 7, 2021

Related U.S. Application Data

(63) Continuation of application No. 16/162,263, filed on Oct. 16, 2018, now Pat. No. 11,023,519.

(51) Int. Cl.
| | |
|---|---|
| *G06F 16/00* | (2019.01) |
| *G06F 16/58* | (2019.01) |
| *G06F 16/583* | (2019.01) |
| *G06F 16/248* | (2019.01) |

(52) U.S. Cl.
CPC ........ *G06F 16/5866* (2019.01); *G06F 16/248* (2019.01); *G06F 16/5846* (2019.01)

(58) Field of Classification Search
CPC . G06F 16/5866; G06F 16/5846; G06F 16/248
See application file for complete search history.

(56) References Cited

U.S. PATENT DOCUMENTS

| | | |
|---|---|---|
| 11,023,519 B1 | 6/2021 | Koy et al. |
| 2005/0278379 A1 | 12/2005 | Nakazawa |
| 2010/0077003 A1 | 3/2010 | Kondo et al. |
| 2017/0255653 A1* | 9/2017 | Zhu .................. G06F 16/51 |

* cited by examiner

*Primary Examiner* — Hung Q Pham
(74) *Attorney, Agent, or Firm* — Athorus, PLLC

(57) ABSTRACT

Methods, systems, and apparatus, including computer programs encoded on a computer storage medium, for providing content. One of the methods includes receiving a target image at an image platform; determining one or more images related to the target image; determining queries associated with the related images; deriving candidate keywords from the determined queries; filtering the candidate keywords to select one or more keywords; and providing the image to one or more users in response to respective incoming queries based on the one or more keywords.

21 Claims, 4 Drawing Sheets

IMAGE KEYWORDS

CROSS-REFERENCE TO RELATED APPLICATION

This is a continuation of U.S. application Ser. No. 16/162,263, filed on Oct. 16, 2018, the disclosure of which is considered part of and is incorporated by reference in the disclosure of this application.

BACKGROUND

This specification relates to providing content for display on a user device.

A conventional search system can search for content using a visual search query, e.g., an image or a collection of images. Typical concerns for such a search system is whether the search system efficiently performs the search and quickly identifies relevant content for the visual search query.

SUMMARY

This specification describes technologies relating to content presentation. These technologies generally involve using related images to identify keywords for a target image. For example, a target image can be a recently submitted image to a social media system without associated keywords. To accurately provide the target image in response to user queries, the new image may need to be associated with keywords that can be matched to a given query. In particular, queries associated with related images can be used to derive candidate keywords for the target image. For example, terms from queries that have a threshold level of engagement history with the corresponding related image can be selected as candidate keywords. The candidate keywords can be further filtered according to one or more criteria. In some implementations, additional candidate keywords can be derived from queries associated with the target image.

In general, one innovative aspect of the subject matter described in this specification can be embodied in methods that include the actions of receiving a target image at an image platform; determining one or more images related to the target image; determining queries associated with the related images; deriving candidate keywords from the determined queries; filtering the candidate keywords to select one or more keywords; and providing the image to one or more users in response to respective incoming queries based on the one or more keywords.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Determining queries associated with each related image includes: determining queries that result in presentation of the related image as a search result on the image platform; and determining one or more of the queries that results in a threshold level of engagement with the related image as a search result. The method further includes determining one or more additional queries, the one or more additional queries associated with the target image; and including keywords extracted from the one or more additional queries in the candidate keywords. Determining one or more images related to the target image includes determining images having a specified degree of visual similarity with the target image. Determining one or more images related to the target image includes determining images that co-occur with the target image in user-defined collections of images. Filtering the candidate keywords includes comparing the keywords to text annotations associated for the target image. Providing the image to one or more users based on the one or more keywords includes using the one or more keywords to target the received image to one or more users of the image platform as sponsored image content.

Particular embodiments of the subject matter described in this specification can be implemented so as to realize one or more of the following advantages. Keywords can be associated with a target image that does not have assigned keywords. The keywords can then be used to identify the target image as responsive to particular received queries. Using queries from related images having a threshold level of engagement improves the likelihood that the keywords are relevant to the target image. An improved likelihood of engagement improves a user experience as well as provides a platform for sponsored content that is more relevant to individual users. In some implementations, related images can similarly be used to determining one or more interests that can be associated with the target image. Those interests can then be used in determining when to present the target image in response to received queries or other user interaction.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for keyword selection.

Like reference numbers and designations in the various drawings indicate like elements.

DETAILED DESCRIPTION

Figure 1:
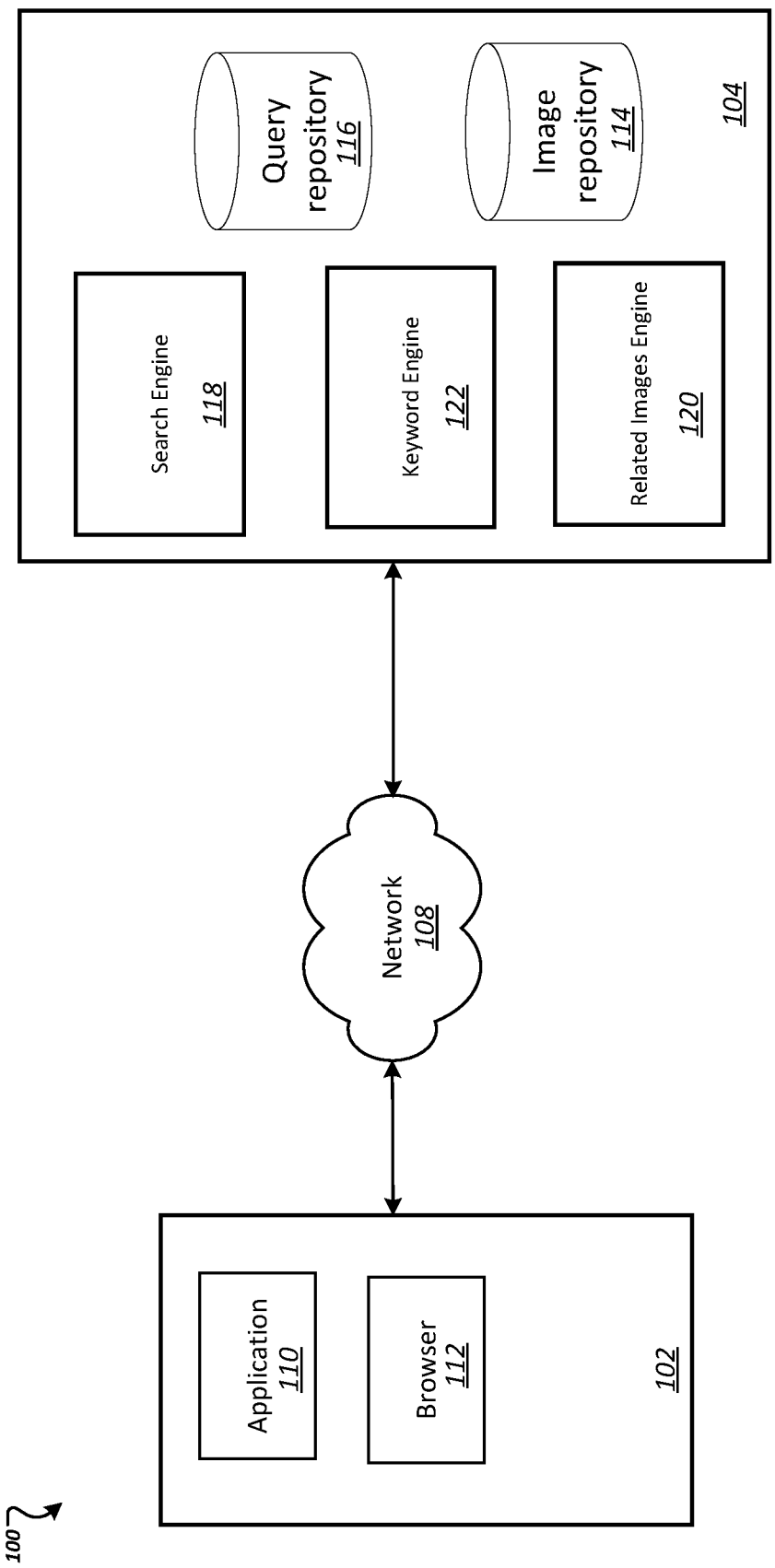
FIG. 1 is block diagram of an example social media system.

FIG. 1 is block diagram of an example social media system 100. Content delivery system 100 includes a representative user device 102 and social media platform 104 communicably coupled to a network 108.

The user device 102 can be a mobile device of a user. The mobile device can be a mobile phone, tablet, or other portable computing device. The user device 102 is shown as including an application 110 and a browser 112. The user device 102 can include other hardware and software components, which are not illustrated for clarity.

The application 110 can be a mobile application specifically configured to communicate with the social media platform 104 using the network 108, e.g., the internet. For example, the user can access content from the social media platform 104 using a user interface of the application 110 presented by a display of the user device 102. Specifically, the application 110 can be associated with a visual bookmarking and discovery platform in which users can view images saved or uploaded by other users and can store collections of selected images. Users can use the application 110, for example, to explore different subjects and save content for later viewing.

The browser 112 can be a web browser application used to access content through the network 108. For example, the browser 112 can be used by the user to view web sites and search for content using a search engine. In particular, the user can access the social media platform 104 through the browser, e.g., by directing the browser to a particular address associated with the social media platform 104.

The social media platform 104 can communicate with user installed applications or browsers on various user devices. For example, the social media platform 104 can receive requests for particular content from the application 110 or browser 112. In response to the request, the social media platform 104 can identify responsive data and provide the data to the user device 102 for display. For example, a user can enter a particular search query in a search field of a user interface for the social media platform 104. The search query is provided to the social media platform 104. The social media platform 104 identifies content responsive to the query using a search engine 118, for example, a collection of images matching one or more terms of the search query. The images matching one or more terms of the search query can be identified and selectively retrieved, for example, from image repository 114. The social media platform 104 then provides particular responsive content, e.g., a group of the identified images, to the user device 102 for display in either the user interface provided by the application 110 or the browser 112.

In another example, a user can select a particular presented image in the user interface. In response to receiving an indication of the selection, the social media platform 104 can provide additional content for display on the user device 102. For example, the social media platform 104 can provide a higher resolution version of the selected image for presentation as an enlarged version on the application user interface. The social media platform 104 can also provide related image content. The related image content can be image content identified as similar to the selected image.

The social media platform 104 includes the image repository 114, query repository 116, the search engine 118, keyword engine 120, and related images engine 122.

The image repository 114 includes images submitted to the social media platform 104. This can include images provided by multiple users, e.g., account holders, of the social media platform 104 as well as images submitted by third party content providers, e.g., advertisers.

The query repository 116 stores information about queries submitted to the social media platform 104 by users. In particular, the query repository 116 can include an association between queries and images. The association can map historical queries to particular images returned in response to the queries. In some implementations, the association can further include engagement data. The engagement data can indicate whether users interacted with the image presented in response to the query, e.g., by selecting or saving the image. The engagement data can provide an indication of how relevant a query is to a particular image.

The search engine 118 uses the query terms to search the image repository 114 for images responsive to the query. For example, the search engine can include an index that identifies images in the image repository 114. The index can further include keywords associated with each image in the image repository. The search engine 118 can, for example, identify images that are responsive to a query based on one or more operations for comparing the query to the indexed keywords. The one or more operations can include comparing individual terms or phrases in the query as well as various query expansion operations such as using synonyms for the query terms.

The related images engine 120 can identify related images to a given image. For example, in response to a user selection of a presented image, the social media platform 104 can provide one or more related images to the user. The related images can be identified by the related images engine 120 from images in the image repository 114, for example, based on a measurement of visual similarity between the user selected image and the images in the repository.

Visual similarity is one example signal for determining similarity. Other signals can be used alone or in combination with visual similarity. For example, another signal that can be used to identify related images is whether or not users have saved images to a same collection. In particular, users of the social media platform can save images to particular collections. Images that co-occur in multiple user collections can indicate that the images are related.

The keyword engine 122 is configured to determine keywords to associate with a given target image as described in greater detail below. Determined keywords can be added to the index entry for the target image such that the keywords can then be used to identify the corresponding image as responsive to particular user search queries.

Figure 2:
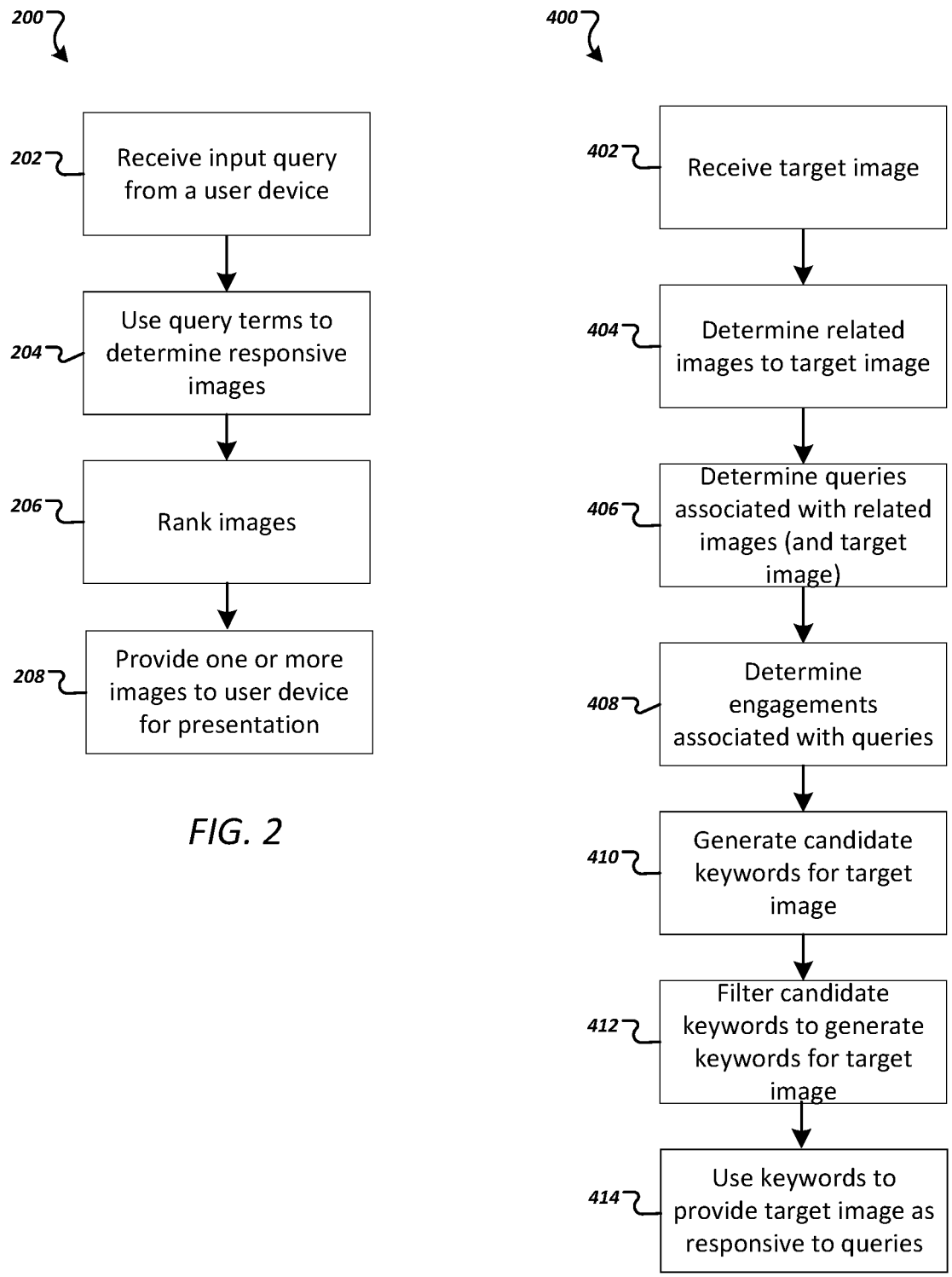
FIG. 2 is a flow diagram of an example process for providing content.

FIG. 2 is a flow diagram of an example process 200 for providing content. For convenience, the process 200 will be described with respect to a system that performs the process. For example, a system can correspond to the social media platform 104 of FIG. 1.

The system receives a search query from a user device (202). The search query can be entered by the user into a search field of a user interface for the system presented on the user device. The entered query is transmitted to the system, e.g., through a network. The search query can be a query seeking particular image content.

The system uses the search query to determine responsive images (204). One or more of the query terms can be used, e.g., by the search engine 118, to identify responsive images, for example, based on the keywords associated with the images. In some implementations, one or more of the query terms can be modified to expand the query. This can be done to expand the search to identify relevant images to the user's query, which may be inexact. Various query expansion techniques can be used including, for example, expanding query terms based on synonyms.

The system ranks responsive images (206). Responsive images can be ranked based on one or more scores assigned to each image. The scores can be based on the degree of match between the search query (original or expanded) and the respective keywords of the responsive images.

The system provides one or more images to the user device for presentation (208). For example, the images can be provided based on a selected number of images in ranked order. The images can be provided for presentation in a results interface that includes an array of images. An example results interface is described below with respect to FIG. 5.

Figure 3:
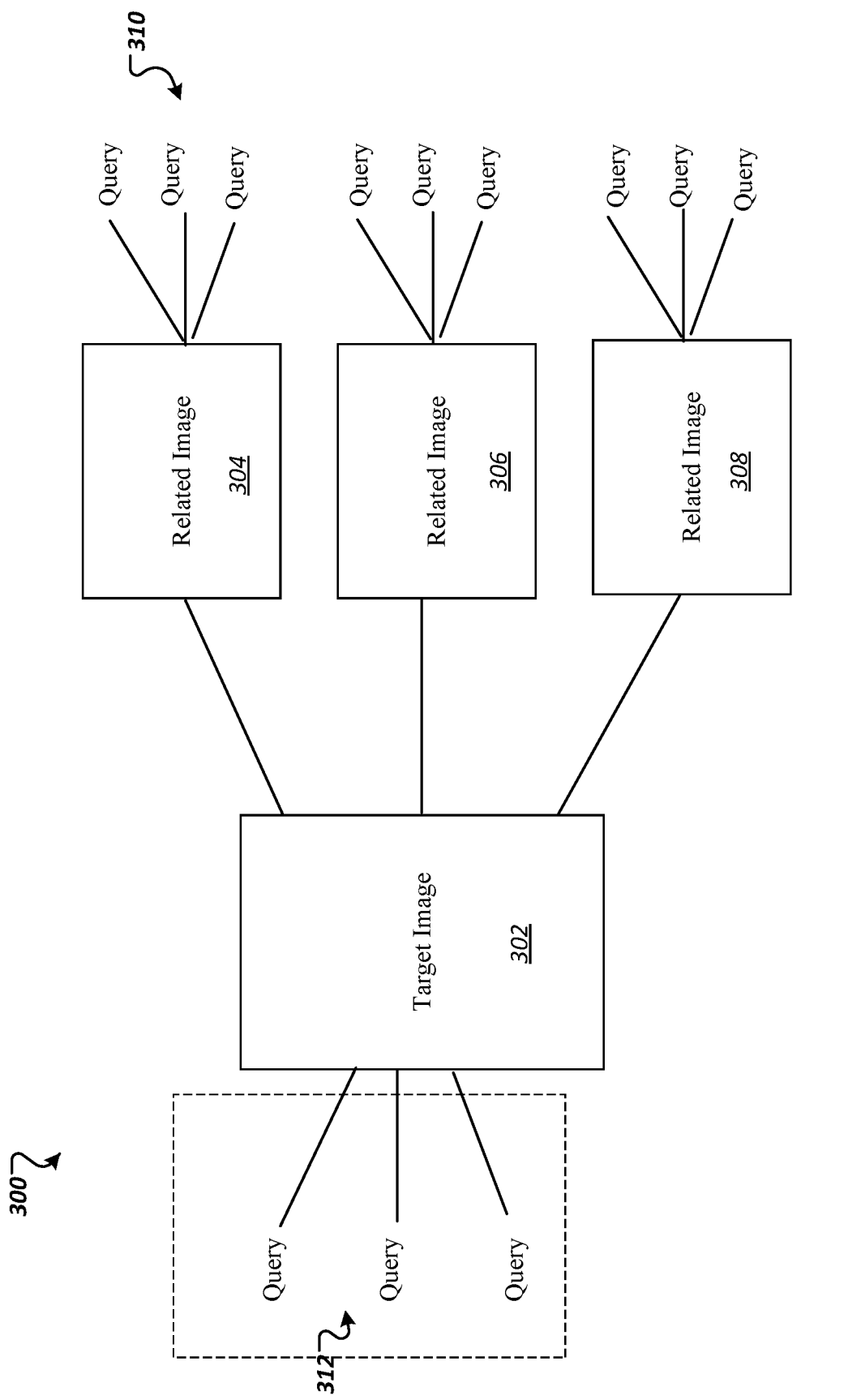
FIG. 3 is a block diagram of an example keyword selection system.

Selecting keywords for a given target image will be described with respect to FIGS. 3-4. FIG. 3 is a block diagram 300 of an example keyword selection system. FIG. 4 is a flow diagram of an example process 400 for keyword selection. For convenience, the process 400 will be described with respect to a system that performs the process. For example, a system can correspond to the social media platform 104 of FIG. 1, and more particularly, using the keyword engine 122.

The system receives a target image (402). The target image 302 can be received, for example, from a content provider seeking to have sponsored content presented to users. In some other implementations, the target image 302 simply represents an image provided by an account holder of the system without keywords. The target image can be uploaded to the system from a user device, for example, using an application or web interface.

The system determines related images to the target image (404). Various techniques can be used to identify related images including visual similarity, text similarity, and image co-occurrence.

In some implementations, the related images are identified based on a similarity analysis that measures visual similarity between images. Images from an image repository, e.g., image repository 114, can be scored based on visual similarity and ranked based on the scores.

Visual similarity can refer to similarity between particular elements in the images for example, depicted objects in the images. Visually similar images can be images that are an exact match to the image or images that are in a similar type or style to the image. For example, if a target image is an image that contains a bag, visually similar images can include images that have bags in a similar style. Visually similar images to a target image of a bag may also include content items that contain images of the exact bag. Techniques for determining visual similarity can include techniques for object recognition as well as feature extraction and analysis using an image classifier or machine learning.

In some implementations, the system identifies candidate related images based on text similarity. Determining text similarity can include comparing text annotations or image descriptions associated with the target image to annotations and descriptions associated with one or more other images. The comparison can ignore common terms such as "and" and "the" to focus the comparison on potentially distinguishing text. Furthermore, in some implementations, synonym expansion techniques can be used to broaden the set of textual terms to compare.

In some other implementations the system identifies candidate related images based on image co-occurrence. For example, users can save images to particular user-defined collections, for example, "cat pictures" or "wedding." If the target image has been saved to particular collections of users, other images that co-occur in those collections may be related images. In particular, images that co-occur in collections of many different users can indicate that the images are related to each other.

In some further implementations, more than one technique can be used to determine candidate related images and the respective scores from different techniques can be combined, for example, both visual similarity and text based similarity can be used to score candidate images and a combination of scores can be used to generate a final score for each image.

The candidate related images can be ranked according to score. One or more of the ranked similar images can be selected as related images to the target image. For example, a specified number of highest ranked images can be selected as related images, e.g., top 5 related images. In another example, all images having a score that satisfies a threshold value can be selected as related images to the target image.

The system determines queries associated with the related images (406). Each of the related images can be associated with historical information indicating which queries the images were returned for. In other words, a given related image was provided in search results responsive to particular queries.

In some implementations, the system further identifies one or more queries associated with the target image. Although the image has not been assigned keywords, it may have been provided to users in response to queries, for example, based on other criteria such as visual similarity with other images or as a sponsored content item, e.g., an advertisement. In some implementations, determining what queries are associated with an image includes using query logs to identify what images user select or interact with in response to a particular search query.

The system determines engagements associated with the queries (408). Even though a given related image may have been returned in response to a query, that alone doesn't show that the image was relevant to the user, e.g., what they were looking for in response to their query. However, if users engaged with the image when returned in response to the query, it can provide a stronger indication that the image was relevant to the particular query. Engagement with the image can include a user selection of the image, e.g., to view an enlarged version of the image, or saving the image to one or more image collections. The system can set a threshold level of engagement with images returned in response to a query to determine an association between image and query. For example, the system can determine that query A is related to image B because users who search for query A engage with image B a specified percentage of the time, e.g., 10 percent.

The system generates candidate keywords for the target image (410). In some implementations, the query terms or phrases for one or more queries associated with the related images and the target image are used as candidate keywords. Furthermore, in some implementations, only queries having a threshold level of engagements are used to generate candidate keywords.

Generic terms that are not likely to convey semantic information about the query can be removed, for example, stop words representing common words, such as "the" "a" "on" etc., can be removed from the queries and not used as keywords.

In addition to the query terms themselves, in some implementations candidate keywords can also be generated from terms of expanded queries. For example, synonyms or other query expansion techniques can be applied to the queries to generated a greater number of candidate keywords. In another example, text annotations associated with user-generated collections in which related images co-occur with the target image can be used to generate additional candidate keywords.

Duplicates between queries can be removed to generate a final set of candidate keywords.

The system optionally filters the candidate keywords to generate final keywords for the target image (412). In some implementations, the candidate keywords are filtered based on text associated with the target image. For example, the target image can include metadata or other data that, for example, describes the image. This text can be entered by the submitter of the image to the system. The text can be compared to the candidate keywords to identify similarities, e.g., shared words or semantically similar words and phrases. Candidate keywords having a threshold similarity to the associated image text can be selected as final keywords.

In some alternative implementations, the filtering is not performed, or there may not be any text associated with the target image. In such cases, the candidate keywords can become the final keywords for the target image.

The system uses the keywords to provide the target image as responsive to particular queries (414). The keywords can be added, for example, to the index used by the search engine to identify images responsive to an incoming query. In some implementations, images and keywords can be associated in a database. For example, a key-value database can relate image identifiers as keys to associated keywords as values. Keywords associated with a given image can be found by looking up the corresponding image identifier in the key-value database.

Based on the match determined by the search engine between the query and the keywords, images can be selected that are responsive to the query and returned to a corresponding client device for presentation in a user interface. In some implementations, the image is an advertising image that is provided as a search result to users in response to particular queries based on the keywords.

In some implementations, in addition to keywords, or as an alternative to keywords, particular interests associated with the target image can be determined. For example, a target image may use interests as a way to determine when to provide the target image for presentation. Thus, a search or user action that indicates particular defined interests can be used to determine when to provide the target image for presentation in a similar manner to keywords.

In situations where, like the keyword situation above, there are no interests initially associated with the target image, the system can use related images to determine interests to associate with the target image. Related images to the target image can be identified as described above. The related images may have associated interests. The system can use those interests as candidate interests that may be similarly filtered to determine final interests to associate with the target image. In some other implementations, the interests are derived from the keywords of the related images. For example, particular interests may be mapped to specific keywords. This mapping can be used to determine whether any of the keywords of associated with the related images are also associated with particular interests.

Figure 5:
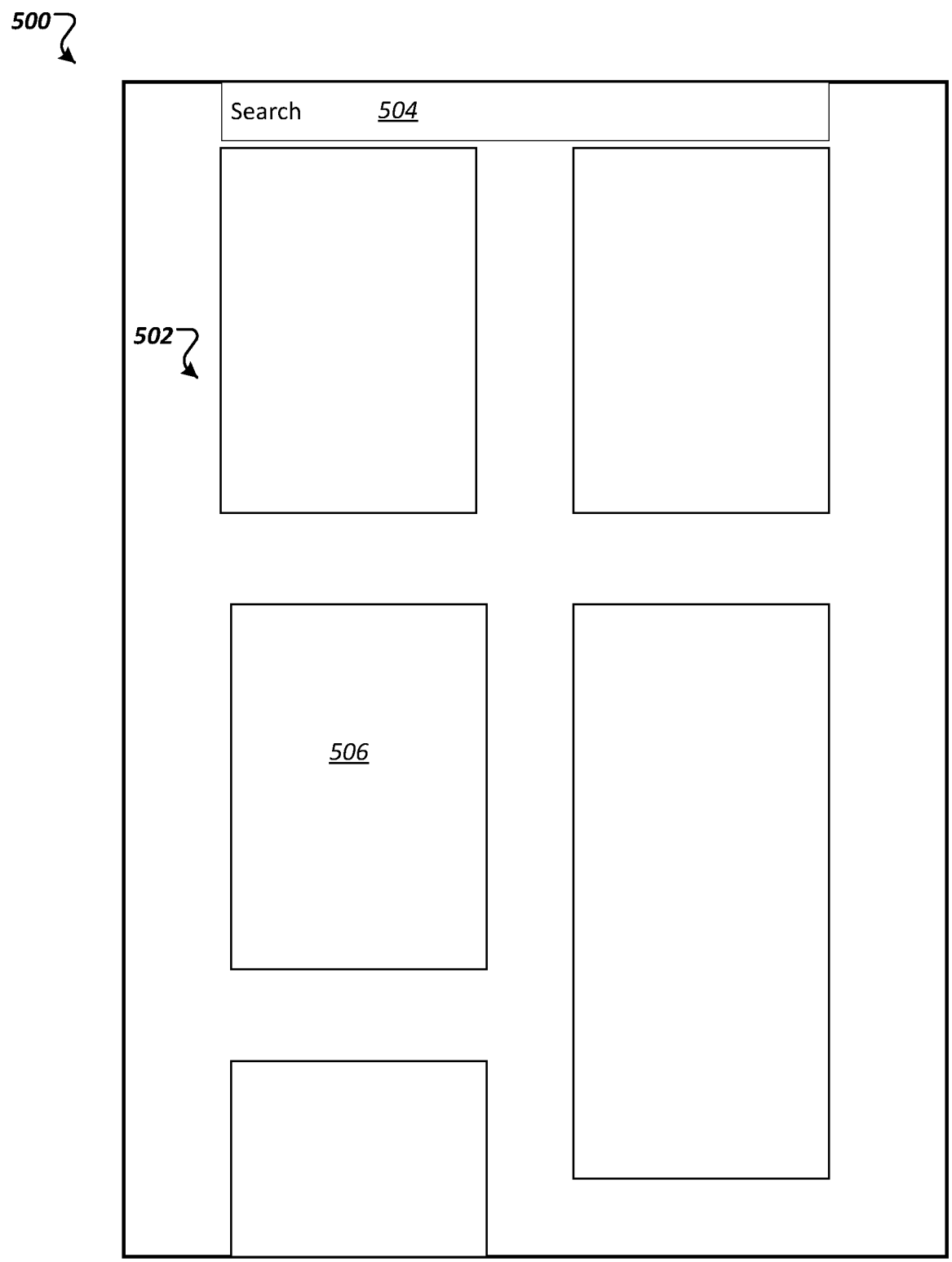
FIG. 5 is a diagram of an example user interface for presenting images responsive to a query.

FIG. 5 is a diagram of an example user interface 500 for presenting images responsive to a query. The user interface 500 can represent the visible portion of a user interface when displayed on a display of the user device. Thus, the user interface 500 may extend further with more images displayed in response to scrolling in a particular direction. The user interface 500 shows a search bar 504 in which a user can specify particular search terms and view, in response, images that are responsive to the search terms. Multiple images 502 are presented in an array of images. The multiple images 502 represent images responsive to the query entered in the search bar 504. The multiple images 502 include target image 506. Target image 506 corresponds to an image in which the keywords were determined by the system, e.g., using the keyword engine. Additionally, the user can select individual images of the multiple images 502 by tapping on the image in a touch screen display or selecting the image with a cursor controlled by a particular input device. In response to a selection, an enlarged version of the image can be presented along with optional additional content such as one or more images related to the selected image.

In this specification the term "engine" will be used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, via a computing network, a target image at an image platform accessible at a network location specified by a network address;
determining, by the image platform, a plurality of images that are related to the target image;
determining, by the image platform, a plurality of queries associated with the plurality of images, wherein the plurality of images were presented in response to the plurality of queries;
determining, by the image platform, a respective user engagement for each corresponding image of the plurality of images, wherein each respective user engagement includes an indication of a user's engagement with the corresponding image of the plurality of images in response to being presented in response to at least one of the plurality of queries;
selecting, by the image platform, one or more queries of the plurality of queries based at least in part on the respective user engagements with the images of the plurality of images;
determining, by the image platform, one or more keywords from the one or mole selected queries of the plurality of queries; and
associating the one or more keywords with the target image.

2. The method of claim 1, further comprising:
receiving, at the image platform from a client device via the computing network, a search query from a first user of the image platform; and
using, by the image platform, the one or more keywords to provide the target image as responsive to the received search query.

3. The method of claim 2, wherein using the one or more keywords to provide the target image comprises:
identifying, by the image platform, search keywords from the received search query; and
using, by the image platform, an index relating keywords to images to identify images responsive to the search keywords.

4. The method of claim 2, further comprising:
determining, by the image platform, one or more interests associated with the target image; and
using, by the image platform, the determined interests to provide the target image as responsive to a received query that indicates one or more of the determined interests.

5. The method of claim 4, wherein determining one or more interests associated with the target image comprises determining related interests associated with one or more images of the plurality of images that are related to the target image; and using the determined related interests as the one or more interests associated with the target image.

6. The method of claim 2, wherein determining the one or more keywords from the one or more queries further comprises:
expanding, by the image platform, each query of the one or more queries; and
using, by the image platform, the expanded queries to determine the one or more keywords.

7. The method of claim 2, further comprising:
filtering, by the image platform, the one or more keywords based on a similarity to metadata text of the target image that describes the target image.

8. A system comprising:
one or more computers and one or more storage devices storing instructions that are operable, when executed by the one or more computers, to cause the one or more computers to perform operations comprising:
receiving, via a computing network, a target image at an image platform accessible at a network location specified by a network address;
determining, by the image platform, a plurality of images that are related to the target image;
determining, by the image platform, a plurality of queries associated with the plurality of images, wherein the plurality of images were presented in response to the plurality of queries;
determining, by the image platform, a respective user engagement for each corresponding image of the plurality of images, wherein each respective user engagement includes an indication of a user's engagement with the corresponding image of the plurality of images in response to being presented in response to at least one of the plurality of queries;
selecting, by the image platform, one or more queries of the plurality of queries based at least in part on the respective user engagements with the images of the plurality of images;
determining, by the image platform, one or more keywords from the one or mole selected queries of the plurality of queries; and
associating the one or more keywords with the target image.

9. The system of claim 8, further comprising:
receiving, at the image platform from a client device via the computing network, a search query from a first user of the image platform; and
using, by the image platform, the one or more keywords to provide the target image as responsive to the received search query.

10. The system of claim 9, wherein using the one or more keywords to provide the target image comprises:
identifying, by the image platform, search keywords from the received search query; and
using, by the image platform, an index relating keywords to images to identify images responsive to the search keywords.

11. The system of claim 8, further comprising:
determining, by the image platform, one or more interests associated with the target image; and
using, by the image platform, the determined interests to provide the target image as responsive to a received query that indicates one or more of the determined interests.

12. The system of claim 11, wherein determining one or more interests associated with the target image comprises:
determining, by the image platform, related interests associated with one or more images of the plurality of images that are related to the target image; and
using the determined related interests as the one or more interests associated with the target image.

13. The system of claim 8, wherein determining the one or more keywords from the one or more queries further comprises:
expanding, by the image platform, each query of the one or more queries; and using, by the image platform, the expanded queries to determine the one or more keywords.

14. The system of claim 8, further comprising:
filtering, by the image platform, the one or more keywords based on a similarity to metadata text of the target image that describes the target image.

15. One or more computer-readable storage media encoded with instructions that, when executed by one or more computers, cause the one or more computers to perform operations comprising:
receiving, via a computing network, a target image at an image platform accessible at a network location specified by a network address;
determining, by the image platform, a plurality of images that are related to the target image;
determining, by the image platform, a plurality of queries associated with the plurality of images, wherein the plurality of images were presented in response to the plurality of queries;
determining, by the image platform, a respective user engagement for each corresponding image of the plurality of images, wherein each respective user engagement includes an indication of a user's engagement with the corresponding image of the plurality of images in response to being presented in response to at least one of the plurality of queries;
selecting, by the image platform, one or more queries of the plurality of queries based at least in part on the respective user engagements with the images of the plurality of images;
determining, by the image platform, one or more keywords from the one or m ore selected queries of the plurality of queries; and
associating the one or more keywords with the target image.

16. The computer-readable storage media of claim 15, further comprising:
receiving, at the image platform from a client device via the computing network, a search query from a first user of the image platform; and
using, by the image platform, the one or more keywords to provide the target image as responsive to the received search query.

17. The computer-readable storage media of claim 16, wherein using the one or more keywords to provide the target image comprises:
identifying, by the image platform, search keywords from the received search query; and
using, by the image platform, an index relating keywords to images to identify images responsive to the search keywords.

18. The computer-readable storage media of claim 15, further comprising:
determining, by the image platform, one or more interests associated with the target image; and
using, by the image platform, the determined interests to provide the target image as responsive to a received query that indicates one or more of the determined interests.

19. The computer-readable storage media of claim 18, wherein determining one or more interests associated with the target image comprises:
determining, by the image platform, related interests associated with one or more images of the plurality of images that are related to the target image; and
using the determined related interests as the one or more interests associated with the target image.

20. The computer-readable storage media of claim 15, wherein determining the one or more keywords from the one or more queries further comprises:
expanding, by the image platform, each query of the one or more queries; and
using, by the image platform, the expanded queries to determine the one or more keywords.

21. The computer-readable storage media of claim 15, further comprising:
filtering, by the image platform, the one or more keywords based on a similarity to metadata text of the target image that describes the target image.

\* \* \* \* \*